(12) United States Patent
Labat

(10) Patent No.: US 10,775,270 B2
(45) Date of Patent: Sep. 15, 2020

(54) SYSTEM AND METHOD FOR MONITORING A TURBOMACHINE, WITH INDICATOR MERGING FOR THE SYNTHESIS OF AN ALARM CONFIRMATION

(71) Applicant: SAFRAN AIRCRAFT ENGINES, Paris (FR)

(72) Inventor: Antonin Lucas Labat, Bougival (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 157 days.

(21) Appl. No.: 15/772,962

(22) PCT Filed: Nov. 4, 2016

(86) PCT No.: PCT/FR2016/052857
§ 371 (c)(1),
(2) Date: May 2, 2018

(87) PCT Pub. No.: WO2017/077247
PCT Pub. Date: May 11, 2017

(65) Prior Publication Data
US 2018/0313721 A1    Nov. 1, 2018

(30) Foreign Application Priority Data
Nov. 5, 2015   (FR) ..................................... 15 60608

(51) Int. Cl.
*G01M 15/14*        (2006.01)
*G06F 11/30*        (2006.01)
(Continued)

(52) U.S. Cl.
CPC ......... *G01M 15/14* (2013.01); *G05B 23/0221* (2013.01); *G05B 23/0235* (2013.01);
(Continued)

(58) Field of Classification Search
CPC ............ G05B 23/0283; G05B 23/0235; G05B 23/0221; G06F 11/079; G06F 11/30
See application file for complete search history.

(56) References Cited

U.S. PATENT DOCUMENTS 6,216,066 B1 *   4/2001   Goebel .............. G05B 23/0232
                                                              340/438
2003/0195718 A1   10/2003  Crowder, Jr.
(Continued)

OTHER PUBLICATIONS

International Search Report dated Feb. 1, 2017 in PCT/FR2016/052857 filed Nov. 4, 2016.
(Continued)

*Primary Examiner* — Daniel S Larkin
*Assistant Examiner* — Anthony W Megna Fuentes
(74) *Attorney, Agent, or Firm* — Oblon, McClelland, Maier & Neustadt, L.L.P.

(57) ABSTRACT

A system for monitoring a turbomachine, including an anomaly detection unit configured to raise an alarm when an operating parameter analysis result exceeds a threshold. The system includes an anomaly confirmation unit for calculating health indicators on the basis of operating parameters and for determining whether a raised alarm is a false alarm or a true alarm by applying a first decision model which merges the health indicators so as to formulate an alarm confirmation/rejection information. The system can moreover include an anomaly classification unit configured to calculate a machine operation diagnosis by applying a second decision model that merges the health indicators when an alarm is determined to be a true alarm.

14 Claims, 2 Drawing Sheets

(51) Int. Cl.
    G05B 23/02    (2006.01)
    G06F 11/07    (2006.01)
(52) U.S. Cl.
    CPC ..... *G05B 23/0262* (2013.01); *G05B 23/0283* (2013.01); *G06F 11/079* (2013.01); *G06F 11/30* (2013.01)

(56) References Cited

U.S. PATENT DOCUMENTS

2015/0013440 A1* 1/2015 Bianucci ............ G05B 23/0216
                                                    73/112.01
2015/0241308 A1* 8/2015 Pandey ................ G01M 15/14
                                                    73/112.01

OTHER PUBLICATIONS

French Preliminary Search Report dated Oct. 14, 2016 in French Application 1560608 filed Nov. 5, 2015.
Rabenoro, T. et al., "Anomaly Detection Based on Indicators Aggregation", 23rd annual Belgian-Dutch Conference on Machine Learning (Benelearn 2014), Jun. 2014, 8 total pages.

* cited by examiner

SYSTEM AND METHOD FOR MONITORING A TURBOMACHINE, WITH INDICATOR MERGING FOR THE SYNTHESIS OF AN ALARM CONFIRMATION

TECHNICAL DOMAIN

The domain of the invention is systems for monitoring the state of health of a machine, such as an engine, and particularly an aircraft engine. The invention relates more particularly to an automated decision aid system for performing maintenance operations on a turbomachine.

STATE OF PRIOR ART

Monitoring of the state of health of a machine aims at improving safety and reliability. Particularly concerning aircraft engines, this monitoring is aimed at avoiding or limiting in-flight shutdowns (IFSD), reducing flight delays and cancellations (D&C), and more particularly facilitating engine maintenance by anticipating failures and even identifying faulty or defective components.

Different monitoring or anomaly detection devices are used to check correct operation of the different engine components, so as to monitor the state of health of an aircraft engine. For example, there is one monitoring device among the monitoring devices to analyse the behaviour of the ignition process, another to analyse the temperature of gases, yet another to detect clogging of filters, another to analyse oil and fuel consumption, etc., and sensors.

Data generated by these monitoring devices are used by ground maintenance services using "health monitoring" algorithms. These algorithms raise alarms when they detect an anomaly.

Automatic monitoring of engines is based exclusively on univariate approaches. The general principle is a variable by variable thresholding approach, the monitored variables being raw physical data related to operation of the engine coupled to a step to confirm that the threshold has been exceeded before raising an alarm. Although this approach is simple, its performance is good if it is required to minimise risks of not detecting a real anomaly in the behaviour of the engine.

Classically, there are three rules for confirming that a threshold has been exceeded:
Type I: An integer number k is fixed. If at least k overshoots are observed on the entire signal, the alarm is raised;
Type II: An integer number k is fixed. If there is a set of k successive measurement points above the threshold, the alarm is raised;
Type III: Two integer numbers k and n are fixed, where k is smaller than n. If at least k points in a set of n successive measurement points are above the threshold, the alarm is raised.

Once an alarm has been raised, an expert in a ground maintenance team must check the operational capacities of the engine. The expert more specifically analyses the variation of a number of operating parameters of the machine to create a more precise diagnosis of the cause of the alarm. If the presence of an anomaly is confirmed, he writes a Customer Notification Report (CNR), and sends it to the customer airline. The report contains data considered by the expert, his analysis of these data and his maintenance recommendations. If the expert does not confirm that an anomaly is present, there will be no follow up to the alarm. It is then said that it is a false alarm.

Good calibration of the health monitoring algorithms is essential to raise useful alarms when the engine behaviour is degraded and to not raise alarms for example following a false detection of an anomaly.

The objectives are firstly to immobilise engines for the shortest possible time to make their operation cost effective, and secondly to judiciously anticipate maintenance operations to avoid expensive repairs. For example, it may be useful to replace a specific part as soon as a critical damage ratio is reached, so as to limit the impact of this degradation on other parts related to the damaged part. In another example, when alarms are raised without good reason, the engine may be immobilised for safety reasons, although an expert verification will confirm that the engine is flightworthy.

At the present time, health monitoring algorithms are calibrated imperfectly due to lack of data about degradation, if any, because engines are repaired for security reasons well before damage can occur.

Furthermore, monitoring devices produce many diverse indicators. Experts can find it difficult to make a decision about whether or not alarms are justified by observing indicators. Therefore they have to spend time on every specific anomaly case, although the large number of engines being monitored obliges them to make decisions in increasingly short times.

Risks are limited because of the univariate approach used by health state monitoring algorithms and the fact that thresholds are deliberately low to give priority to detection, but at the same time the proportion of false alarms received by experts is enormously increased. It is estimated that only 1 to 2% of alarms raised by automatic monitoring applications correspond to true anomalies. Experts thus lose an enormous amount of time in examining situations in which there are no anomalies.

PRESENTATION OF THE INVENTION

The purpose of the invention is to disclose a decision-making assistance solution for performing machine maintenance operations that can accelerate the work done by experts by supplying better quality information. In other words, the invention aims to improve the expertise level of a solution for automatic monitoring of the state of machine health.

To achieve this, the invention discloses a system for monitoring a turbomachine, comprising a unit for detection of anomalies configured to analyse turbomachine operating parameters and to raise an alarm if a threshold is exceeded by a result of an analysis of one of the operating parameters of the turbomachine. The system comprises an anomalies confirmation unit configured to calculate health indicators from turbomachine operating parameters and to determine if a raised alarm is a true alarm or a false alarm by applying a first decision model that merges health indicators to create alarm confirmation/rejection information.

Some preferred but non-limitative aspects of this system are as follows:
the anomalies detection unit is configured to raise an alarm if an analysis result of one of the turbomachine operating parameters respects a rule for confirmation that the threshold has been exceeded;
the system also includes an anomalies classification unit configured to calculate a turbomachine operation diagnosis, applying a second decision model merging health indicators, the anomaly classification unit not calculating the operation diagnosis until the anomalies confirmation unit has confirmed that a raised alarm is a true alarm;

the health indicators are statistical test results;

a plurality of statistical tests is used for each turbomachine operating parameter during learning of the first decision model.

The invention includes a method and a computer program for monitoring a turbomachine.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED PRESENTATION OF PARTICULAR EMBODIMENTS

In general, the invention discloses a tool capable of automatically providing information helpful for making decisions about machine maintenance operations. One advantageous application of the invention is maintenance of an aircraft engine, for example a turbomachine, although this is not limitative.

In this framework, the invention discloses a monitoring system for a machine that can reduce the number of false alarms without modifying the anomaly detection rate (true alarms). To achieve this, the system is installed after anomaly detection devices that raise alarms. As a result, no new alarms are generated and the anomaly detection rate is unchanged. Furthermore, the system applies a multivariate analysis of machine operating parameters to determine if a raised alarm is a true alarm or a false alarm. It is more efficient in this respect than classical methods used by anomaly detection devices that are based on a univariate analysis of operating parameters, and advantageously is more closely related to the analysis method used by experts.

Figure 1:
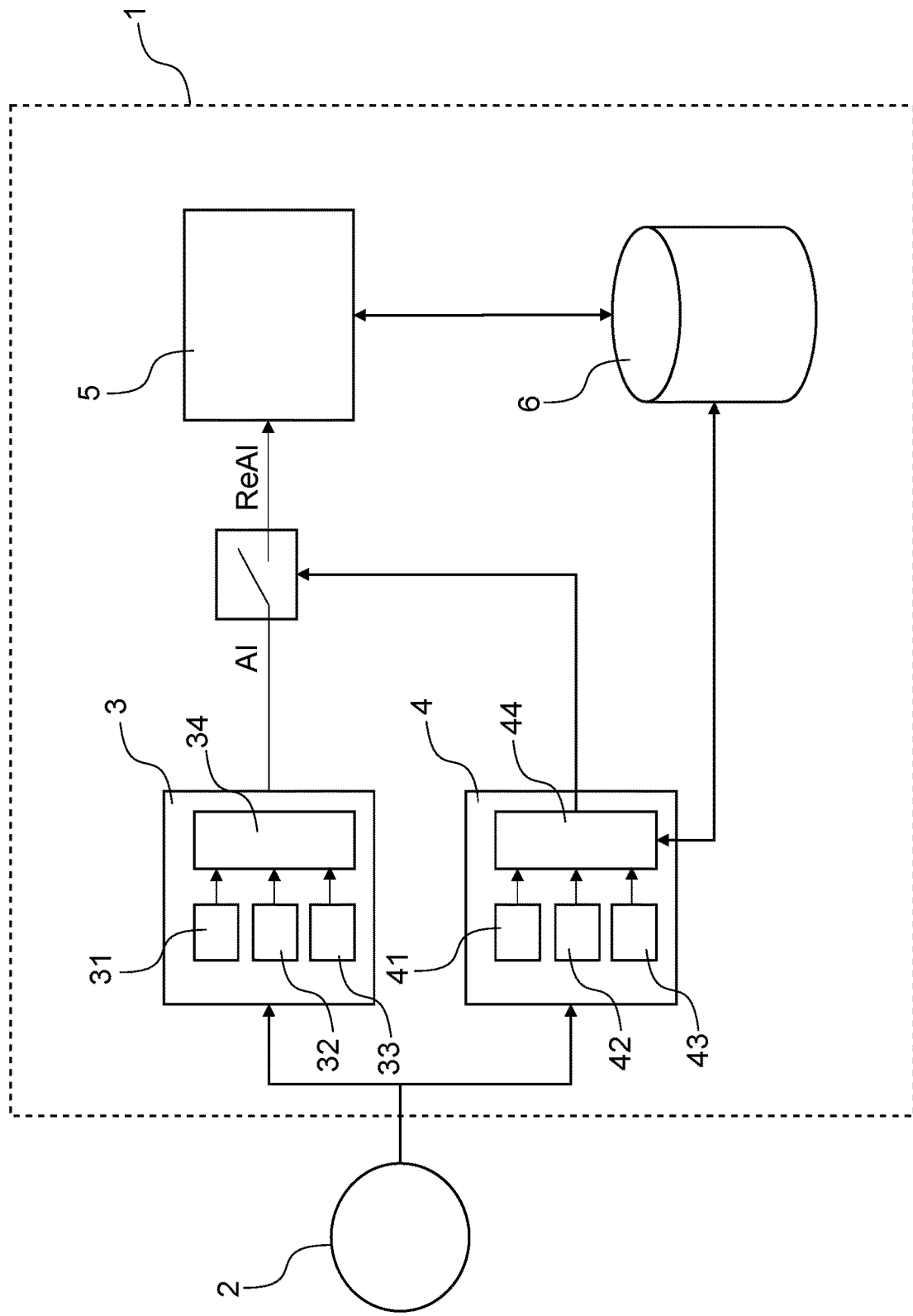
FIG. 1 diagrammatically illustrates a monitoring system for a machine according to one possible embodiment of the invention.

With reference to FIG. 1, the invention relates more particularly to a monitoring system for a machine such as an aircraft engine 2. The system 1 comprises an anomaly detection unit 3 configured to analyse operating parameters of the machine 2 and to raise an alarm Al if a threshold is exceeded by a result of an analysis of an operating parameter of the turbomachine.

The anomaly detection unit 3 comprises various anomaly detection modules 31, 32, 33. These modules receive operating parameters related to different machine components and are configured to determine indicators from these parameters and to detect anomalies in these indicators. These indicators are thus designated by the term anomaly indicators.

The anomaly indicators produced by the modules 31, 32, 33 are the results of calculations, generally outputs from algorithms, or statistical test results. For example, they may be outputs from health monitoring algorithms or summaries or results of test analyses.

Typically, the monitoring of aircraft engine fleets, measurements made during each flight are analysed by a fleet manager. In this invention, these analyses are made by anomaly detection modules 31, 32, 33 that for example implement algorithms that detect sudden changes in the behaviour of the engine from flight to flight. There are several sorts of changes (sudden or progressive), several ways of observing them (long or short term), and about a hundred signals to be looked at separately or in combination. Therefore there is a wide range of anomaly detection modules (several thousand) that all supply their anomaly indicators after each flight.

These anomaly indicators are input to an alarm trigger unit 34 configured to raise an alarm Al if the result of the analysis of one of the machine operating parameters respects a threshold exceeded confirmation rule, for example one of the type I, type II or type III rules mentioned above. An alarm Al thus raised can be a false alarm (as it is in most cases) or a true alarm.

According to the invention, the monitoring system 1 comprises an anomalies confirmation unit 4 configured to determine if an alarm Al raised by the anomalies detection unit 3 is a false alarm or a true alarm.

Figure 2:
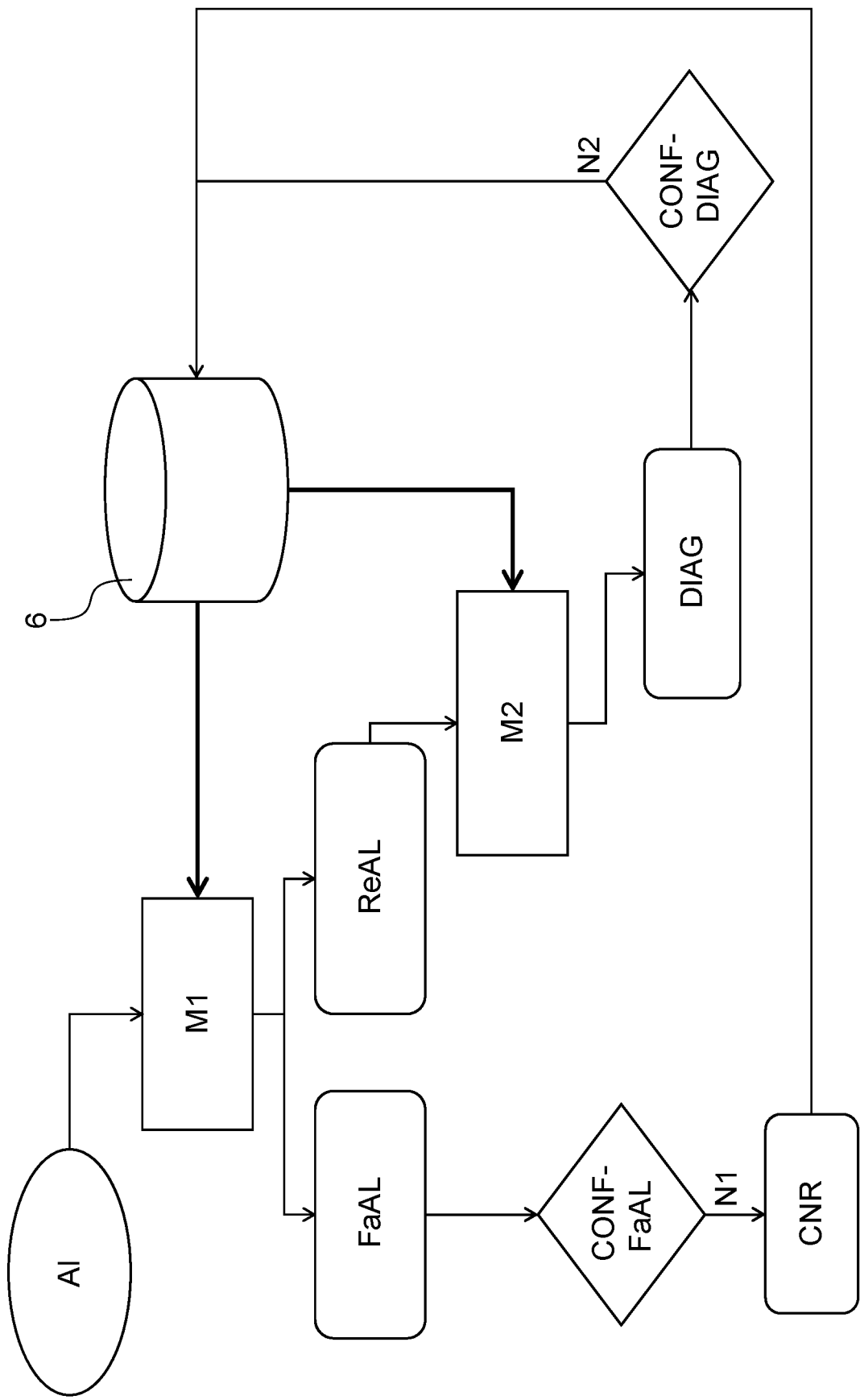
FIG. 2 diagrammatically illustrates a decision aid method for maintenance of a machine according to one possible embodiment of the invention.

With reference to FIG. 2, the anomalies confirmation unit 4 is configured particularly to calculate health indicators from machine operating parameters and to determine if a raised alarm Al is a false alarm FaAl or a true alarm ReAl by applying a first decision model M1 that merges health indicators to create alarm confirmation/rejection information (for example a binary indicator that may be equal to the value 1 or 0 depending on whether or not the alarm is confirmed, or a confidence level in the result of the classification). Merging in this way makes it possible to consider operating parameters of the turbomachine in a multivariate manner.

The anomalies confirmation unit 4 comprises various health indicator generation modules 41, 42, 43. These modules receive operating parameters related to different machine components and are configured to determine health indicators from these measurements.

The health indicators are preferably statistical test results. When a statistical test is made, a hypothesis H0 called the zero hypothesis is evaluated, in comparison with a hypothesis H1 called the alternative hypothesis. A random variable called a test variable for which the law is known under hypothesis H0, is constructed based on operating parameters. It is then possible to determine if H0 is true by fixing a threshold on the test variable, called the test level. Therefore it is a binary result 0 or 1: 0 corresponds to the absence of an anomaly (i.e. hypothesis H0 is kept) and 1 corresponds to the presence of an anomaly (i.e. hypothesis H0 is rejected).

Health indicators are supplied to an alarm classification unit 44 that merges them and synthesises the merged information by means of the first decision model M1. This first decision model comprises a set of rules for classifying the alarm Al as either a false alarm or a true alarm.

In the framework of the invention, the first decision model can be capable of supervised learning, in other words it can automatically generate its rules from a learning database containing operating parameters related to different machine components and health indicators associated with alarm classifications validated by experts.

This learning can be made by different methods. For example, it can make use of a naive Bayes or a random forest type classification algorithm. It can also be based on regression methods (such as neuron networks) or it can make use of a reasoner using fuzzy logic.

The first decision model M1 can thus be a naive Bayes classification or a classification derived from the application of a decisional random forest algorithm. The naive Bayes type algorithm gives results that experts can easily understand, and is used in preference for initialisation of the method of implementing the invention. It is more didactic for experts, so that they can be more confident in the invention. Then, once the initialisation phase is complete, a "random forest" type algorithm can be used: it gives better results, but they are more difficult to interpret.

The anomaly detection modules 31, 32, 33 are dependent on the hyper-parameterisation of the algorithms that they use. Hyper-parameterisation means all input parameters to the algorithm that are not data representative of operation of the machine. A small modification of these parameters can cause a complete change to the response of the algorithm. For example, a small variation in the anomaly detection threshold can make a very large difference to alarm triggering conditions.

In order to overcome these problems with calibration of anomaly detection algorithms, in one possible embodiment of learning of the first decision model, the invention discloses that a list of possible parameterisations can be considered for each observed variable, a health indicator can be calculated for each set of parameters in the list, and possibly a statistical selection of the most relevant hyper-parameterisations can be made.

The calculation of a health indicator can include the following operations. The first step consists of smoothing the signal representing the observed variable, to reduce noise. This smoothing can be done by making a moving average that can be calibrated in different ways. In this case, a first hyper-parameter is chosen that is the smoothing made.

The next step is to consider the signal on a sliding time window offset at a fixed pitch on a series of iterations in order to scan the entire signal. In this case two hyper-parameters are chosen, namely the window size and the pitch at which the window moves.

A statistical test to characterise an anomaly is then defined. The associated test variable on the sliding time window is then constructed at each iteration. In this case a fourth hyper-parameter is fixed: the choice of the test.

The decision of a statistical test also depends on a self-imposed threshold. This threshold, or confidence level of the test, is also a hyper-parameter. It quantifies the level of confidence in the rejection of acceptance of a hypothesis.

The final step is a confirmation operation. There are several hyper-parameters. The type of confirmation has to be fixed, for example type I, type II or type III. If a type I or type II confirmation is chosen, the parameter k also has to be fixed. In the case of a type III confirmation, the parameters k and n have to be fixed.

As an illustrative example, the following list of hyper-parameters can be selected for a given operating parameter:
Smoothing:
  order 3 moving average
  order 5 moving average
Size of sliding window:
  30 points
  100 points
Pitch of the sliding window:
  1 point
  5 points
Statistical test:
  Mann-Whitney-Willcoxon rank test
  Kolmogorov-Smirnov test
  Fisher test
  Student test under the equal variances hypothesis
  Student test under the unequal variances hypothesis
  Test of the existence of a non-zero slope
  Test of the existence of a change of slope
Confidence level of the test. As this level becomes higher, the tendency to keep H0 to the detriment of H1 will also increase:
  5%
  20%
Confirmation type:
  Type I with k=3, 7 or 13
  Type II with k=3, 7 or 13
  Type III with:
    n=5 and k=3
    or n=10 and k=3, or 7
    or, n=20 and k=3, 7 or 13

Therefore in this example, a plurality of indicators is chosen for the operating parameter considered, namely $2*2*2*7*2*12=1344$ indicators.

The next step can be to select indicators to eliminate indicators that are not very relevant or are strongly redundant. This selection can be made using the mRMR (minimum Redundancy Maximum Relevance) method, for example to finally retain only 200 indicators.

These indicators thus selected will be used to construct the first decision model by emphasising a set of statistical tests (for example 200 tests) selected from among all the tests considered with hyper-parameterisation.

The health indicators that are calculated by the health indicator generation modules 41, 42, 43 and supplied to the alarm classification unit 44 are statistical test results selected among all tests considered with the hyper-parameterisation.

The following work can be referred to for information about the calculation and selection of indicators and their use as inputs to a classification model:

Tsirizo Rabenoro, Jerome Lacaille, Marie Cottrell, Fabrice Rossi. Anomaly Detection Based on Aggregation of Indicators. 23rd annual Belgian-Dutch Conference on Machine Learning (Benelearn 2014), Jun. 2014, Brussels, Belgium. pp.64-71.

It will be noted that in this work, the classification model aims to classify an anomaly as a function of its type, while the first model according to the invention is a two-class model to confirm or reject an alarm.

The system according to the invention can be used as a new confirmation type that may be more complex than any of the three "classical" types (type I, II and III), but is much more reliable. Furthermore, the invention takes account of the three previously existing types by incorporating them. Thus, when it is decided to use methods involving a type I, II or III confirmation, the merge can be applied making use of the first decision model as a type IV confirmation.

In one possible embodiment of the invention, the classification model presented in the above-mentioned work can be used such that the monitoring system according to the invention can automatically calculate an operation diagnosis for the machine. An operation diagnosis refers to information about whether or not a particular type of operation (such as an anomaly) is present, potentially accompanied by a probably of occurrence of the particular operation.

In this embodiment, the monitoring system also comprises an anomalies classification unit 5 configured to calculate an operation diagnosis of the machine by applying a second decision model that merges the health indicators. More particularly, the operation diagnosis calculation is only made by the anomalies classification unit 5 when a raised alarm Al is confirmed as being a true alarm ReAl by the anomalies confirmation unit 4.

The second decision model uses health indicators as input, for example the most recent 10 results of all health indicator generation modules 41, 42, 43. It merges them and synthesises the merged information into a single operation diagnosis information, for example information indicating an absence of sudden change or information indicating a given type of sudden change (performance, compressor, turbine, vibration, etc.), on one or several operating parameters. Successive detections of a given type of operation diagnosis can conform the diagnosis information thus produced.

As in the first decision model, the second decision model is capable of supervised learning, in other words it can automatically generate its rules from a learning database containing machine operating parameters and health indicators associated with operating diagnoses validated by experts.

The second decision model can also use a naive Bayes classification or a classification derived from the application of a decisional random forest algorithm. And it can be generated using the hyper-parameterisation and selection of indicators mentioned above. The statistical tests for the calculation of health indicators used for learning in the second decision model can be different from the statistical tests for the calculation of health indicators used for learning in the first decision model. The result is that the health indicators input to the alarm classification unit 44 so as to classify the alarm using the first decision model M1 are not necessarily identical to the health indicators input to the anomalies classification unit 5 so as to determine an operation diagnosis using the second decision model M2, associated with an alarm classified by the first model as being a true alarm. Merging of health indicators by the first model can thus be different from merging of health indicators by the second model in the sense that this merging does not necessarily apply to the same indicators calculated by the health indicator generation modules 41, 42, 43.

As shown on FIG. 1, the monitoring system 1 also comprises a database 6 for the storage of machine operating parameters, health indicators and alarms diagnosed by expertise as being true or false alarms, for learning of the first decision model. The database 6 may also contain health indicators and operation diagnoses formulated by expertise, for learning of the second decision model.

Each of these models may be capable of relearning so that it can be corrected and improved making use of operating experience with the precision of the classification made. Thus for the first model, if an alarm is classified as being a false alarm or a true alarm, while an expert analysis of this alarm concludes that in fact it is a true alarm or a false alarm respectively, the classification error is used to modify the first decision model (in other words relearning is done to minimise the classification error). Similarly, it there is a disagreement between the operation diagnosis automatically calculated using the second model and the expert diagnosis, the second decision model can be modified.

There is no need to relearn a model every time that it makes a mistake. For example, periodic complete learning would be possible. Relearning would also be possible after a predetermined number of classification errors has been reached. It is also possible to opt for a different solution for each of the two models. The capacity of the first model to not close true alarms is vitally important. The role of the second model is more for consultation than for decision making. Therefore it can be relearned less frequently than the first model.

The invention is not limited to the monitoring system as described above, but also includes a machine monitoring method, including an anomalies detection step comprising an analysis of machine operating parameters and raising an alarm if a threshold is exceeded by an analysis result for one of the operating parameters.

With reference to FIG. 2, after an alarm Al has been raised, the method comprises an anomalies confirmation step comprising the calculation of health indicators from machine operating parameters and the application of a first decision model M1 that merges health indicators to determine if a raised alarm is a false alarm FaAl or a true alarm ReAl.

If it is determined that the alarm is a true alarm ReAl, the method may also include an anomalies classification step comprising the calculation of an operation diagnosis DIAG of the machine by application of a second decision model M2 that merges health indicators. An operation diagnosis confirmation steep CONF-DIAG can then be made during which the calculated operation diagnosis DIAG is confirmed or rejected by an expert. If it is rejected ("N2"), the classification error is entered in the database 6, particularly ready for relearning of the second model M2.

If the alarm is determined by the first model M1 as being a false alarm FaAl, an alarm classification confirmation step CONF-FaAl can be made. If an expert indicates that the alarm really is a true alarm ("N1"), he writes a "Customer Notification Report" in a step "CNR" and the classification error is input into the database 6, particularly ready for future relearning of the first model M1.

The invention also includes a computer program including code instructions for the execution of steps in the method according to the invention when said program is executed on a computer.

The invention claimed is:

1. A turbomachine monitoring system, comprising: processing circuitry configured to perform analyses of turbomachine operating parameters and raise an alarm when a threshold is exceeded by a result of one of the performed analyses, and after the alarm is raised, calculate health indicators from the turbomachine operating parameters, and determine whether the raised alarm is a false alarm or is a true alarm, by merging the calculated health indicators using a first decision model.

2. The system according to claim 1, wherein the processing circuitry is further configured to raise the alarm when a result of one of the performed analyses satisfies a rule for confirmation that the threshold has been exceeded.

3. The system according to claim 1, wherein the processing circuitry is further configured to
calculate an operation diagnosis by merging the health indicators using a second decision model, and
not calculate the operation diagnosis when determining that the raised alarm is the false alarm.

4. The system according to claim 1, wherein the health indicators calculated by the processing circuitry are statistical test results.

5. The system according to claim 4, wherein the processing circuitry is further configured to learn the first decision model based on results of a plurality of statistical tests used for each of the turbomachine operating parameters.

6. The system according to claim 1, further comprising a memory storing the turbomachine operating parameters, the health indicators, and raised alarms diagnosed by an expert as being true or false alarms.

7. The system according to claim 6, wherein the memory further stores operating diagnoses in association with raised alarms diagnosed by the expert as being true alarms.

8. The system according to claim 1, wherein the processing circuitry is configured to learn rules of the first decision model using supervised learning.

9. The system according to claim 8, wherein the first decision model used by the processing circuitry is a naive Bayes classification or a classification derived from the application of a decisional random forest algorithm.

10. The turbomachine monitory system of claim 1, wherein the processing circuitry is further configured to merge the calculated health indicators using the first decision model, which includes a set of rules to classify the alarm as the false alarm or the true alarm, based on the calculated health indicators.

11. A method of monitoring a turbomachine, comprising: performing analyses of turbomachine operating parameters, raising an alarm when a threshold is exceeded by a result of one of the performed analyses, and after the alarm is raised, calculating health indicators from the turbomachine operating parameters, and merging the calculated health indicators using a first decision model to determine whether the raised alarm is a false alarm or is a true alarm.

12. The method according to claim 11, further comprising, after the raised alarm is determined as being the true alarm, calculating a machine operation diagnosis by merging the health indicators using a second decision model.

13. A non-transitory computer-readable medium storing code instructions that, when executed, cause processing circuitry to perform the method according to claim 11.

14. A turbomachine monitoring system, comprising:
processing circuitry configured to perform analyses of turbomachine operating parameters and raise an alarm when a threshold is exceeded by a result of one of the performed analyses, and after the alarm is raised calculate health indicators from the turbomachine operating parameters, and determine whether the raised alarm is a false alarm or is a true alarm, by merging the calculated health indicators using a first decision model, wherein the processing circuitry is further configured to calculate an operation diagnosis by merging the health indicators using a second decision model, only when the raised alarm is determined to be the true alarm.

* * * * *